(12) United States Patent
Arakawa et al.

(10) Patent No.: US 11,142,166 B2
(45) Date of Patent: Oct. 12, 2021

(54) SHARING SYSTEM USING VALET KEY

(71) Applicant: KABUSHIKI KAISHA TOKAI RIKA DENKI SEISAKUSHO, Aichi (JP)

(72) Inventors: Masahiro Arakawa, Aichi (JP); Masahiko Oya, Aichi (JP); Junji Murase, Aichi (JP); Shinya Saguchi, Aichi (JP); Yuji Fukano, Aichi (JP); Shinya Watanabe, Aichi (JP); Yosuke Doi, Aichi (JP); Takanori Matsuyama, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/047,828

(22) PCT Filed: Apr. 18, 2019

(86) PCT No.: PCT/JP2019/016644
§ 371 (c)(1),
(2) Date: Oct. 15, 2020

(87) PCT Pub. No.: WO2019/203306
PCT Pub. Date: Oct. 24, 2019

(65) Prior Publication Data
US 2021/0114557 A1 Apr. 22, 2021

(30) Foreign Application Priority Data

Apr. 20, 2018 (JP) .............................. JP2018-081578

(51) Int. Cl.
*B60R 25/24* (2013.01)
*E05B 81/56* (2014.01)
(Continued)

(52) U.S. Cl.
CPC .......... *B60R 25/241* (2013.01); *B60R 25/102* (2013.01); *E05B 81/56* (2013.01);
(Continued)

(58) Field of Classification Search
CPC ........ G06Q 50/10; G06Q 10/02; B60R 25/24; B60R 25/241; B60R 25/102; G06F 21/44; E05B 49/00; E05B 81/56; G08G 1/00
See application file for complete search history.

(56) References Cited

U.S. PATENT DOCUMENTS 9,171,268 B1 * 10/2015 Penilla .................. B60L 53/305
9,189,900 B1 * 11/2015 Penilla ..................... H04L 9/14
(Continued)

FOREIGN PATENT DOCUMENTS

| JP | 2016-071834 A | 5/2016 |
| JP | 2016-115077 A | 6/2016 |
| WO | 2016/031607 A1 | 3/2016 |

OTHER PUBLICATIONS

International Search Report, dated May 21, 2019 by the Japan Patent Office, in International Application No. PCT/JP2019/016644.
(Continued)

*Primary Examiner* — Brian E Miller
(74) *Attorney, Agent, or Firm* — Greenblum & Bernstein, P.L.C.

(57) ABSTRACT

A sharing system includes a sharing device arranged in a shared subject and a valet key that is allowed to operate the shared subject. The sharing system further includes a portable terminal that obtains key information required to use the shared subject and is allowed to operate the shared subject when the key information is authenticated through communication with the sharing device. The sharing system further includes a privilege granting unit that grants privilege to operate the shared subject from the portable terminal (Continued)

to the valet key, and a restriction imposing unit that imposes a restriction on use of the portable terminal when the operation privilege for the shared subject is granted from the portable terminal to the valet key.

5 Claims, 7 Drawing Sheets

(51) Int. Cl.
  *G06Q 10/02* (2012.01)
  *G06Q 50/10* (2012.01)
  *B60R 25/102* (2013.01)
  *G06F 21/44* (2013.01)
  *G08G 1/00* (2006.01)
  *E05B 49/00* (2006.01)

(52) U.S. Cl.
  CPC ............. *G06Q 10/02* (2013.01); *G06Q 50/10* (2013.01); *B60R 25/24* (2013.01); *E05B 49/00* (2013.01); *G06F 21/44* (2013.01); *G08G 1/00* (2013.01)

(56) References Cited

U.S. PATENT DOCUMENTS

| | | | |
|---|---|---|---|
| 10,242,516 | B2 | 3/2019 | Konishi |
| 10,493,953 | B2* | 12/2019 | Arakawa ............ G07C 9/00571 |
| 10,661,752 | B2* | 5/2020 | Matsuyama ............ B60R 25/24 |
| 10,668,896 | B2* | 6/2020 | Arakawa ............... G06Q 10/025 |
| 2016/0055699 | A1 | 2/2016 | Vincenti |
| 2016/0318481 | A1* | 11/2016 | Penilla ................... B60L 53/80 |
| 2016/0347282 | A1* | 12/2016 | Krishnan ................ B60R 25/23 |
| 2017/0278329 | A1 | 9/2017 | Konishi |
| 2017/0316621 | A1* | 11/2017 | Jefferies ................. G06Q 50/30 |
| 2018/0059913 | A1* | 3/2018 | Penilla .................. B60W 40/08 |
| 2018/0082504 | A1* | 3/2018 | Park ....................... B60R 25/24 |
| 2018/0257604 | A1* | 9/2018 | Komeya ................ H04L 63/102 |
| 2018/0293827 | A1* | 10/2018 | Vincenti ............. G07C 9/00857 |
| 2019/0152435 | A1* | 5/2019 | Ujkashevic ............ G06Q 50/30 |
| 2019/0371176 | A1* | 12/2019 | Montemurro ........... H04L 63/20 |

OTHER PUBLICATIONS

Written Opinion of the International Searching Authority, dated May 21, 2019 by the Japan Patent Office, in International Application No. PCT/JP2019/016644.

* cited by examiner

SHARING SYSTEM USING VALET KEY

TECHNICAL FIELD

The present invention relates to a sharing system that allows a shared subject to be used by a number of persons.

BACKGROUND ART

A known example of a sharing system in which the same shared subject is shared by a number of persons is a car sharing system in which the same vehicle (shared vehicle) is used by a number of persons (refer to Patent Documents 1 and 2). In this type of car sharing system, for example, use of the car sharing is registered in advance. For example, after reserving a vehicle with a portable terminal (high-performance mobile phone etc.), usage of the vehicle is permitted during a reserved period of time.

PRIOR ART DOCUMENTS

Patent Documents

Patent Document 1: Japanese Laid-Open Patent Publication No. 2016-115077
Patent Document 2: Japanese Laid-Open Patent Publication No. 2016-71834

SUMMARY

To allow for the use of valet parking services, it is desirable that, for example, a portable terminal grant a valet key with privilege to operate a vehicle and permit the valet key to perform vehicle operations associated with valet parking or the like. However, this may lead to unauthorized use or the like of the vehicle if the operation privilege of the valet key remains valid after receiving the valet parking service.

It is an object of the present invention to provide a sharing system that can maintain security against unauthorized use of a shared subject, while granting operation privilege to a valet key from a portable terminal to permit operation of the shared subject.

A sharing system in accordance with one embodiment includes a sharing device arranged in a shared subject, a valet key that is allowed to operate the shared subject, and a portable terminal that obtains key information required to use the shared subject and is allowed to operate the shared subject when the key information is authenticated through communication with the sharing device. The sharing system further includes a privilege granting unit, which grants privilege to operate the shared subject from the portable terminal to the valet key, and a restriction imposing unit, which imposes a restriction on use of the portable terminal when the operation privilege for the shared subject is granted from the portable terminal to the valet key.

With this configuration, when the portable terminal grants operation privilege to the valet key, a restriction is imposed on the use of the portable terminal. Thus, when using the valet key, the portable terminal cannot be freely operated. This allows for acknowledgement that operation privilege has been granted to the valet key. As a result, the user will be reminded that the valet key has been granted operation privilege, and a situation in which the user forgets that the valet key has been left granted with the operation privilege will be avoided. This allows security against unauthorized use of a shared subject to be maintained, while granting operation privilege to a valet key from a portable terminal to permit operation of the shared subject.

Preferably, the sharing system includes a restriction cancelation unit that cancels the restriction set to the portable terminal when an operation is performed to invalidate the operation privilege granted to the valet key. With this configuration, even if a restriction is imposed on the portable terminal, the portable terminal can be returned to the original non-restricted state.

Preferably, in the sharing system, the operation privilege is the key information used for authentication by the portable terminal and the sharing device, and the key information is a one-time key that can be used only once or within a fixed time period. With this configuration, situations are limited in which the key information is used in an unauthorized manner to operate the shared subject. This is advantageous for improving security.

Preferably, in the sharing system, the restriction imposing unit imposes a restriction on use of the portable terminal and executes a process for notifying a user that the valet key has been granted the operation privilege when the shared subject is operated by the portable terminal. With this configuration, the user is notified that operation privilege has been granted to the valet key.

Preferably, in the sharing system, the restriction imposing unit imposes a restriction on use of the portable terminal and executes a process for prompting a user to perform a one-action operation before operating the shared subject with the portable terminal. With this configuration, when the valet key is granted operation privilege, the user will be prompted to perform a one-action operation whenever the portable terminal is operated so that the user will not forget that operation privilege has been granted to the valet key.

The present invention allows security against unauthorized use of a shared subject to be maintained, while granting operation privilege to a valet key from a portable terminal to permit operation of the shared subject.

DESCRIPTION OF THE EMBODIMENTS

Figure 1:
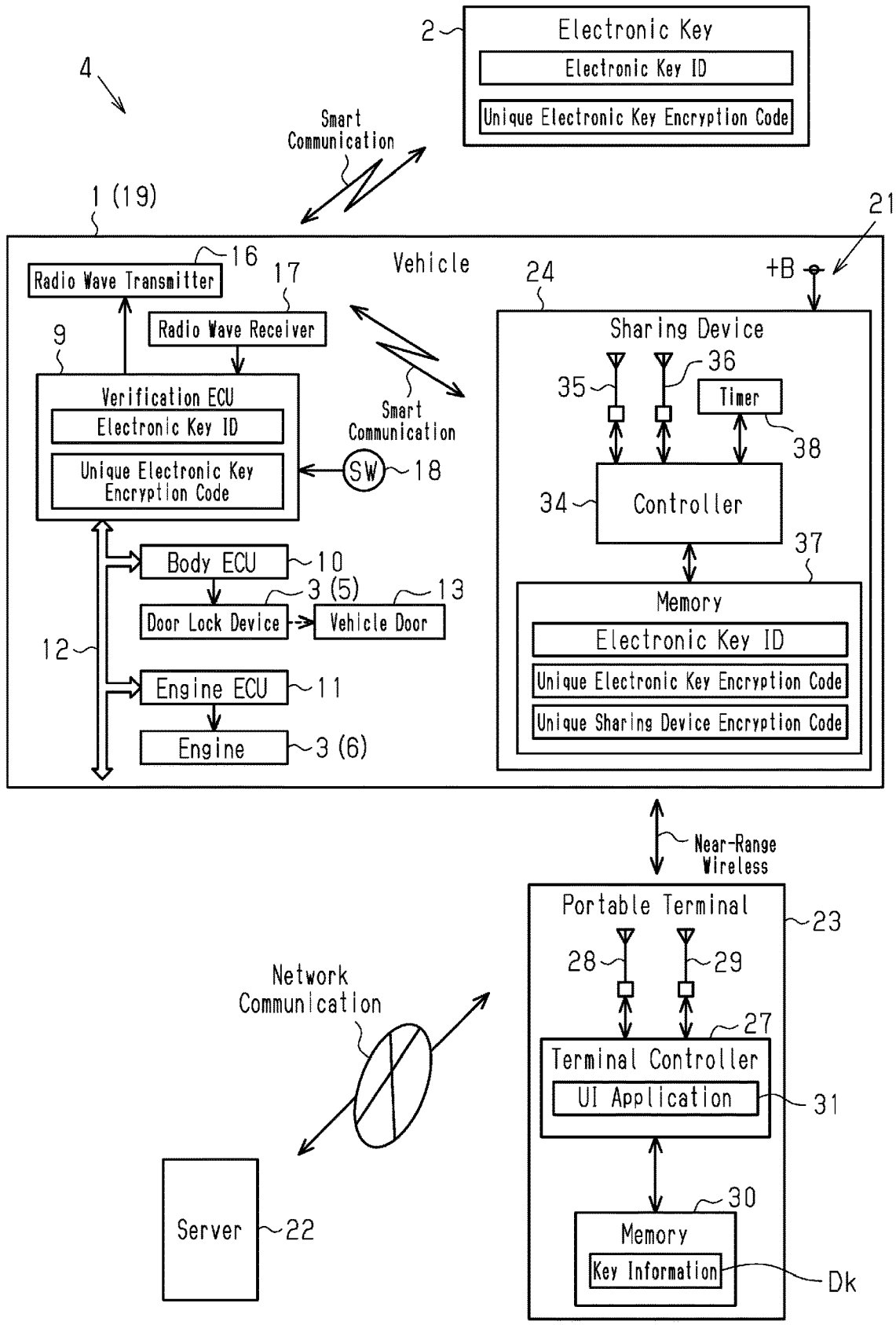
FIG. 1 is a diagram showing the configuration of a sharing system in accordance with one embodiment.

One embodiment of a sharing system will now be described with reference to FIGS. 1 to 10.
As shown in FIG. 1, a vehicle 1 includes an electronic key system 4 in which ID verification is performed through wireless communication established with an electronic key 2 to execute or permit actuation of an in-vehicle device 3. The electronic key system 4 is a key-operation-free system in which ID verification (smart verification) is performed through near-range wireless communication when communication is established with the vehicle 1. The electronic key system automatically performs ID verification (smart verification) without the electronic key 2 being directly operated. The in-vehicle device 3 includes, for example, a door lock device 5 and an engine 6.

The vehicle 1 includes an electronic control unit (ECU) 9 that performs ID verification, a body ECU 10 that manages the power for on-board electric devices, and an engine ECU 11 that controls the engine 6. The ECUs 9 to 11 are electrically connected by a communication line 12 in the vehicle. The communication line 12 is, for example, a controller area network (CAN) or a local interconnect network (LIN). The verification ECU 9 and the electronic key 2 each include a memory (not shown) in which an electronic key ID of the electronic key 2, which is registered to the vehicle 1, and a unique electronic key encryption code, which is used for authentication during ID verification, are registered. The body ECU 10 controls the door lock device 5 to lock and unlock a vehicle door 13.

The vehicle 1 includes a radio wave transmitter 16 that transmits radio waves and a radio wave receiver 17 that receives radio waves. Although not shown in the drawings, the radio wave transmitter 16 includes, for example, a transmitter used to transmit radio waves outside a passenger compartment and a transmitter used to transmit radio waves inside the passenger compartment. The radio wave transmitter 16 transmits radio waves on a low frequency (LF) band. The radio wave receiver 17 receives radio waves on an Ultra High Frequency (UHF) band. The electronic key system 4 performs LF-UHF bidirectional communication (smart communication) with the electronic key 2.

When a wake signal for activating the electronic key 2 is transmitted from the radio wave transmitter 16 on the LF band and the electronic key 2 enters a communication area of the wake signal, the electronic key 2 is activated from a standby state to perform communication (smart communication) with the verification ECU 9 and execute ID verification (smart verification). The smart verification includes, for example, electronic key ID verification that checks the authenticity of an electronic key ID or challenge response authentication that uses the encryption code (in present example, unique electronic key encryption code). When determining that ID verification of the electronic key 2 outside the passenger compartment (exterior smart communication) has been accomplished, the verification ECU 9 permits or performs locking or unlocking of the vehicle door 13 with the body ECU 10.

When determining that ID verification of the electronic key 2 inside the passenger compartment (interior smart communication) has been accomplished, the verification ECU 9 permits power shifting with an engine switch 18. As a result, for example, when the engine switch 18 is operated while a brake pedal is depressed, the engine 6 will be started.

The vehicle 1 includes a sharing system 21 allowing a single vehicle 1 (shared subject 19) to be shared by a number of persons. The sharing system 21 of the present example registers encrypted key information Dk from an external device (in present example, server 22) to a portable terminal 23. Further, the sharing system 21 verifies the key information Dk with the portable terminal 23 and a sharing device 24 arranged in the vehicle 1. The sharing system 21 uses the verification result as one condition for allowing operation of the vehicle 1. Preferably, the key information Dk is, for example, a one-time key (one-time password) that can be used only once or only within a fixed time period.

The portable terminal 23 includes a terminal control unit 27, a network communication module 28, a near-range wireless communication module 29, and a memory 30. The terminal control unit 27 controls actuation of the portable terminal 23. The network communication module 28 performs network communication. The near-range wireless communication module 29 performs near-range wireless communication. Data is rewritable to the memory 30. When the portable terminal 23 obtains the key information Dk through network communication from the server 22, the portable terminal 23 stores the key information Dk in the memory 30. Preferably, the near-range wireless communication is, for example, Bluetooth® communication.

The portable terminal 23 includes a user interface application 31 that manages actuation of the sharing system 21. For example, the user interface application 31 is downloaded from the server 22 and installed to the terminal control unit 27. The terminal control unit 27 executes the user interface application 31 to perform, for example, various types of processes such as reservation of the vehicle 1, user authentication, vehicle operation, operation privilege granting, and returning of operation privilege.

The sharing device 24 is independent from the hardware of the electronic key system 4 of the vehicle 1 and installed in the vehicle 1 separately from the electronic key system 4. The sharing device 24 serves as an electronic key that is valid, for example, only during a period in which the vehicle 1 is reserved. The sharing device 24 is supplied with power from a battery +B of the vehicle 1.

The sharing device 24 includes a controller 34 that controls actuation of the sharing device 24, a smart communication block 35 that performs smart communication, a near-range wireless communication module 36, a memory 37 that stores rewritable data, and a timer 38 that stores date and time. When the controller 34 receives the key information Dk through near-range wireless communication from the portable terminal 23, the controller 34 checks whether the key information Dk can be correctly decrypted with the encryption code in the memory 37 (in present example, unique sharing device encryption code) to determine whether the portable terminal 23 is authentic. The timer 38 is, for example, a soft timer. A sharing device ID registered to the sharing device 24 is linked to a vehicle ID (vehicle body number) so that the sharing device 24 and the vehicle 1 have a one-to-one relationship.

Figure 2:
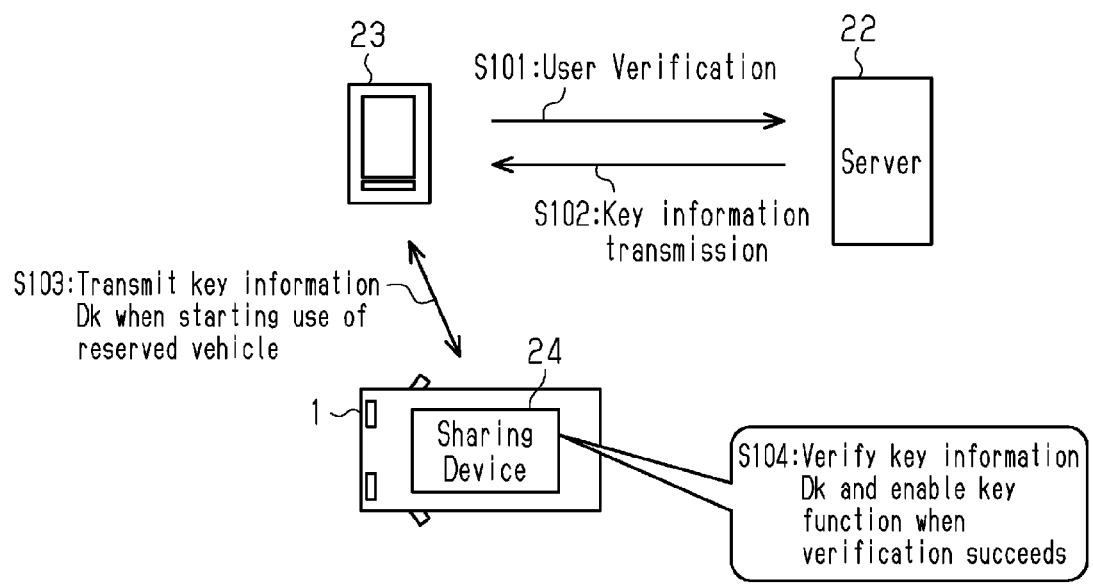
FIG. 2 is a diagram illustrating a user authentication procedure.

As shown in FIG. 2, in step 101, when using the portable terminal 23 to reserve the vehicle 1, the portable terminal 23 performs user authentication through network communication with the server 22. The user authentication of the present example includes, for instance, a login (authentication of user ID and password) and a vehicle reservation procedure. The vehicle reservation procedure includes, for example, the input of the used vehicle, date, time, and the like. The user ID and the password are input to the portable terminal 23 and transmitted through network communication to the server 22. Upon receipt of the user ID and the password from the portable terminal 23, the server 22 authenticates the user ID and password and continues processing if authentication is successful and forcibly terminates processing if authentication is unsuccessful.

In step 102, when user authentication is successful, the server 22 generates and transmits the key information Dk to the portable terminal 23. In the present example, the server 22 uses, for example, the encryption code of the sharing device 24 (e.g., unique sharing device encryption code) installed in the reserved vehicle to generate the key information Dk. The key information Dk in the present example includes ciphertext generated by encrypting cleartext such as "reserved date and time," "terminal ID," and "user authentication code" with a cipher (encryption algorithm) using a predetermined encryption code (e.g. unique sharing device encryption code or the like). The terminal ID is a unique ID of the portable terminal 23. The user authentication code is one type of a code used in encrypted communication performed between the portable terminal 23 and the sharing device 24 when, for example, operating the vehicle 1 with the portable terminal 23.

In step 103, when starting use of the reserved vehicle, the portable terminal 23 transmits the key information Dk, which is registered to the portable terminal 23, through near-range wireless communication. The key information Dk is, for example, transmitted to the sharing device 24 using Bluetooth Low Energy (BLE).

In step 104, the sharing device 24 receives the key information Dk from the portable terminal 23 and authenticates the key information Dk. In the present example, the sharing device 24 decrypts the key information Dk with the encryption code (e.g. unique sharing device code or the like) and checks whether the decryption is successful. When the decryption of the key information Dk is successful, the key information Dk received from the portable terminal 23 is correct, and the authentication of the key information Dk is thereby successful. When authentication of the key information Dk is successful, the sharing device 24 obtains the "reserved date and time, "terminal ID," and "user authentication code" from the key information Dk.

When authentication of the key information Dk is successful, the sharing device 24 shifts to an "authentication completion state" with regard to the key information Dk. This enables the sharing device 24 to function as the electronic key 2 (key function of sharing device 24 is activated). Thus, the sharing device 24 is allowed to perform smart communication (smart function) through the electronic key system 4. Further, when authentication of the key information Dk is successful, the sharing device 24 stores the key information Dk and the user authentication code in the memory 37. When authentication of the key information Dk is unsuccessful, the key information Dk is incorrect and authentication has failed. Thus, the sharing device 24 disrupts BLE communication.

When the key information Dk is authenticated, the sharing device 24 performs near-range wireless communication to notify the portable terminal 23 of the user authentication code obtained through the authentication. The portable terminal 23 receives the user authentication code from the sharing device 24 and registers the user authentication code to the memory 30. In this manner, the user authentication code is registered to both of the portable terminal 23 and the sharing device 24.

Figure 3:
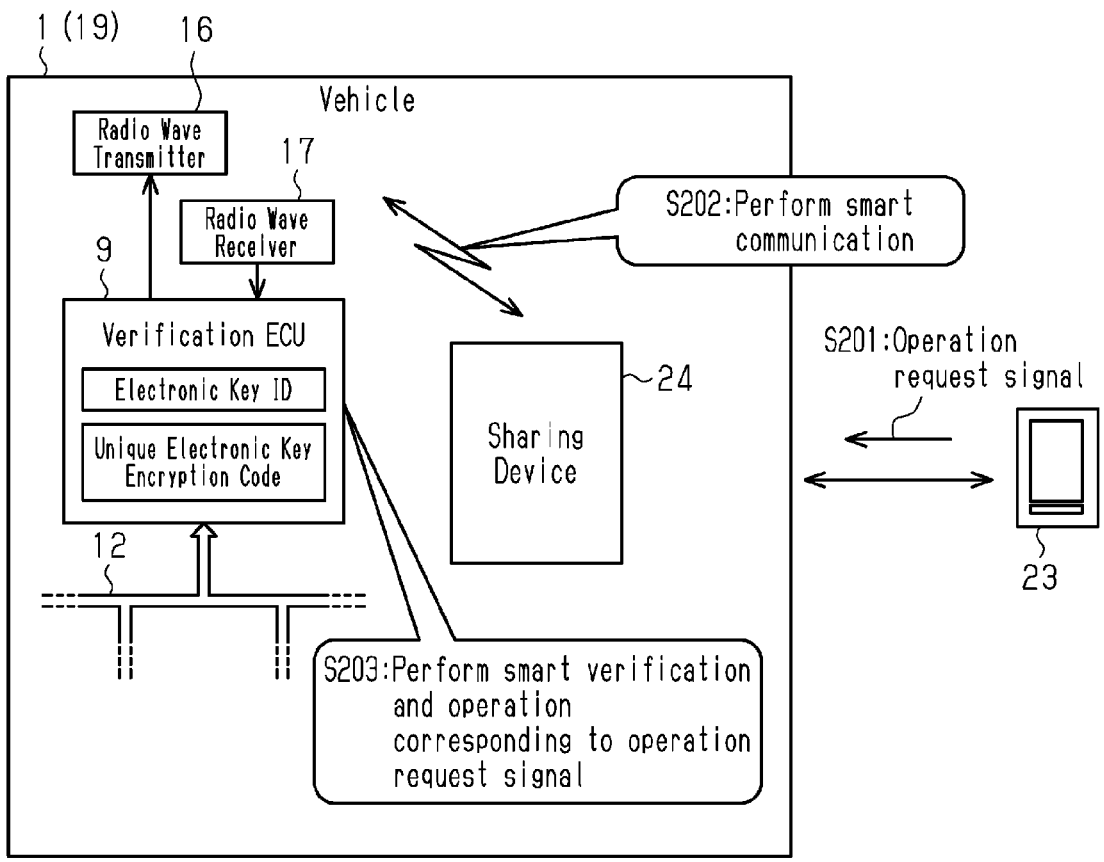
FIG. 3 is a diagram illustrating a vehicle operation procedure performed by a portable terminal.

As shown in FIG. 3, in step 201, when an operation request button (display button on screen) of the portable terminal 23 is operated after shifting to the authentication completion state, the portable terminal 23 transmits an operation request signal, which corresponds to the button, to the sharing device 24. The operation request button may be, for example, an unlock request button operated to unlock the vehicle door 13, a lock request button operated to lock the vehicle door 13, and an engine start button operated when permitting the vehicle 1 to start the engine 6. The operation request signal is a signal including a command corresponding to the operated operation request signal. The operation request signal is encrypted with, for example, the user encryption code when transmitted.

In step 202, upon receipt of the operation request signal from the portable terminal 23, the sharing device 24 performs smart communication with the verification ECU 9 and notifies the verification ECU 9 of the operation request signal received from the portable terminal 23. In the present example, the sharing device 24 performs smart verification using the electronic key ID and the encryption code stored in the sharing device 24 and notifies the verification ECU 9 of the operation request signal received from the portable terminal 23 during the verification.

In step 203, when the verification ECU 9 confirms that smart verification performed with the sharing device 24 has succeeded, the verification ECU 9 performs the operation corresponding to the operation request signal from the sharing device 24. This locks or unlocks the vehicle door 13 or permits engine starting.

Figure 4:
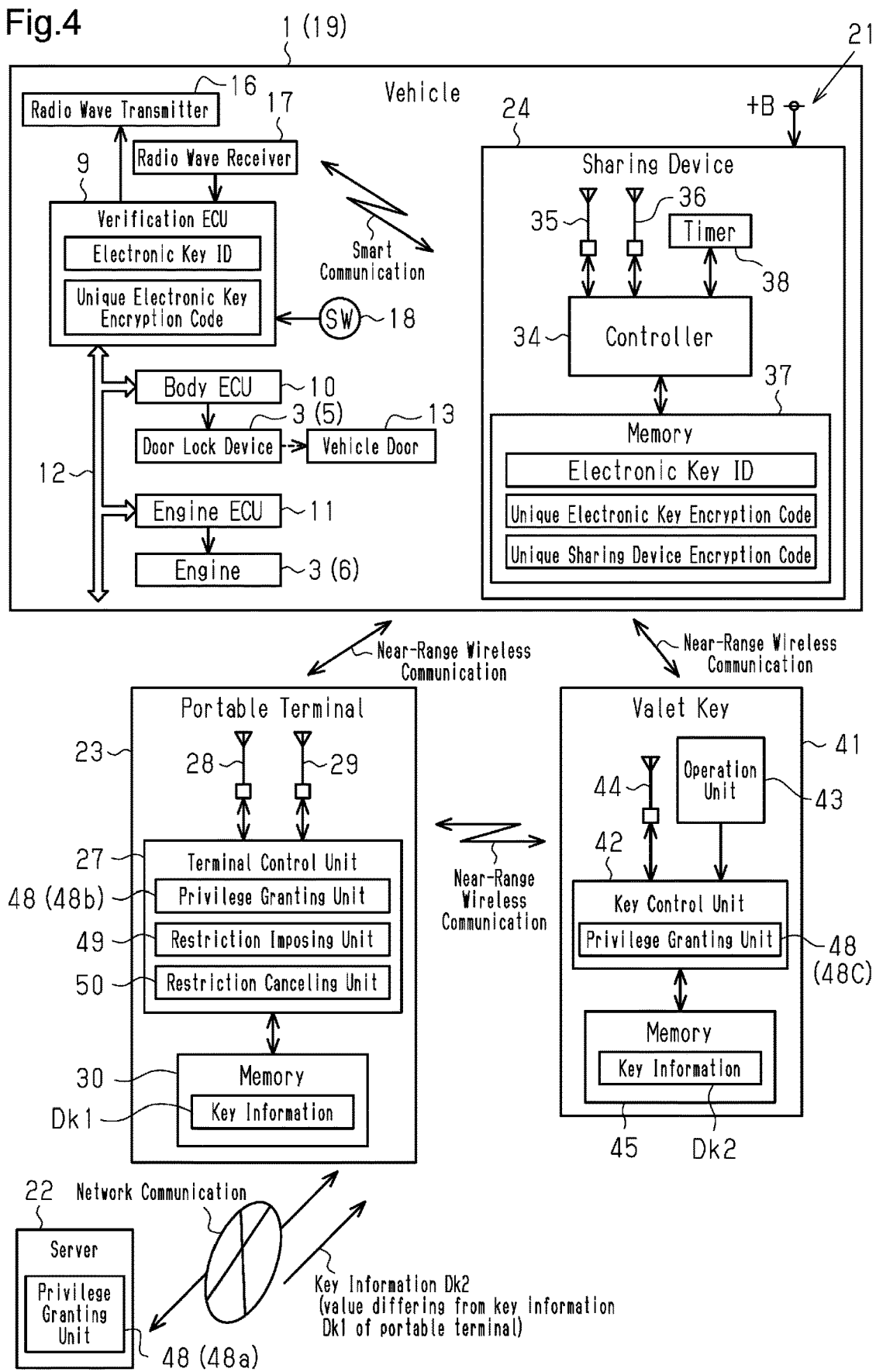
FIG. 4 is a diagram showing the configuration of a sharing system applicable to valet parking service.

As shown in FIG. 4, the sharing system 21 is applicable to a valet parking service in which one asks another person such as a valet to park the vehicle. In the present example, when lending the vehicle 1 to another person, the valet key 41 is handed to the other person, such as a valet, to lend the vehicle 1. The valet key 41 is one type of a vehicle key (electronic key 2) allowing the vehicle 1 to be operated and used as a vehicle key lent to another person.

The valet key 41 includes a key control unit 42 that controls actuation of the valet key 41, an operation unit 43 operated when operating the vehicle 1 with the valet key 41, a communication module 44 that can perform near-range wireless communication, and a memory 45 that stores rewritable data. The communication module 44 communicates with the portable terminal 23 and the sharing device 24 through, for example, Bluetooth communication. The operation unit 43 includes an unlock operation portion operated to unlock the vehicle door 13, a lock operation portion operated to lock the vehicle door 13, an engine start permitting portion operated to permit starting of the engine 6, and a power operation portion operated when turning on and off the power of the valet key 41.

The sharing system 21 includes a privilege granting unit 48 that grants the valet key 41 privilege from the portable terminal 23 to operate the vehicle 1. The privilege granting unit 48 of the present example includes a first privilege granting unit 48*a* provided in the server 22, a second privilege granting unit 48*b* provided in the portable terminal 23, and a third privilege granting unit 48*c* provided in the valet key 41. The first privilege granting unit 48*a* generates code information for the portable terminal 23 (hereafter, referred to as the first key information Dk1) and code information for the valet key 41 (hereafter, referred to as the second key information Dk2) and then transmits the first key information Dk1 and the second key information Dk2 to the portable terminal 23. When the portable terminal 23 and the valet key 41 perform communication (Bluetooth communication), the second privilege granting unit 48*b* transmits the second key information Dk2 for the valet key 41 to the valet key 41, and the third privilege granting unit 48*c* registers the second key information Dk2 to the valet key 41.

The sharing system 21 includes a restriction imposing unit 49 that imposes a restriction to usage of the portable terminal 23 when the valet key 41 is granted privilege to operate the vehicle 1 by the portable terminal 23. The restriction imposing unit 49 is provided in the terminal control unit 27 of the portable terminal 23. The restriction imposing unit 49 of the present example, switches a usage mode of the portable terminal 23 from a "normal mode" to a "restriction mode"

when the portable terminal 23 grants the valet key 41 privilege to operate the vehicle 1. Any process can be performed in the restriction state to restrict usage of the portable terminal 23.

The sharing system 21 includes a restriction canceling unit 50 that cancels a restriction state when an operation is performed to invalidate the operation privilege granted to the valet key 41. The restriction canceling unit 50 is provided in the terminal control unit 27 of the portable terminal 23. The restriction canceling unit 50 of the present example cancels the restriction set for the portable terminal 23 and returns the usage mode of the portable terminal 23 to the normal state when the operation privilege granted to the valet key 41 is invalidated by the portable terminal 23.

The operation and advantages of the sharing system 21 in accordance with the present embodiment will now be described with reference to FIGS. 5 to 10.

Figure 5:
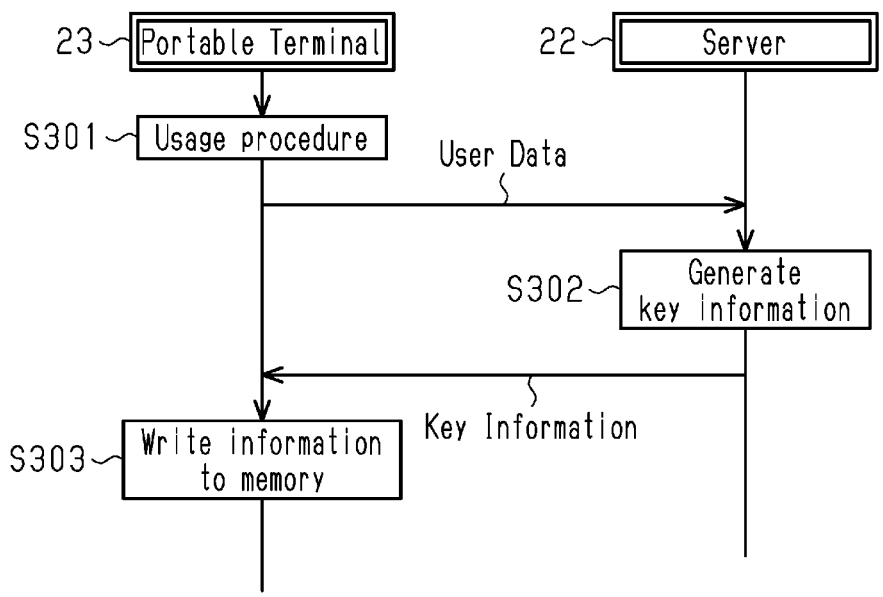
FIG. 5 is a flowchart illustrating a key information issuance procedure.

FIG. 5 is a flowchart illustrating the procedure for reserving and using the vehicle 1 with the portable terminal 23. In step 301, when the user uses the portable terminal 23 to perform a procedure for using the vehicle 1, the portable terminal 23 obtains the user data input during the procedure. As described above, in the procedure, for example, the user ID, password, and date and time of use of the vehicle 1 are input. The portable terminal 23 transmits the user data obtained in the procedure to the server 22. The portable terminal 23 also transmits the terminal ID of the portable terminal 23 and the terminal ID of the valet key 41 as the user data.

In step 302, upon receipt of the user data from the portable terminal 23, the server 22 generates the key information Dk. Here, the server 22 (first privilege granting unit 48*a*) generates the first key information Dk1 issued to the portable terminal 23 and the second key information Dk2 issued to the valet key 41. The server 22 (first privilege granting unit 48*a*) transmits the generated first key information Dk1 and the second key information Dk2 to the portable terminal 23. The first key information Dk1 and the second key information Dk2 include different user authentication codes.

In step 303, upon receipt of the first key information Dk1 and the second key information Dk2 from the server 22, the portable terminal 23 (second privilege granting unit 48*b*) writes the first key information Dk1 and the second key information Dk2 to the memory 30. This registers the first key information Dk1 and the second key information Dk2 to the portable terminal 23.

Figure 7:
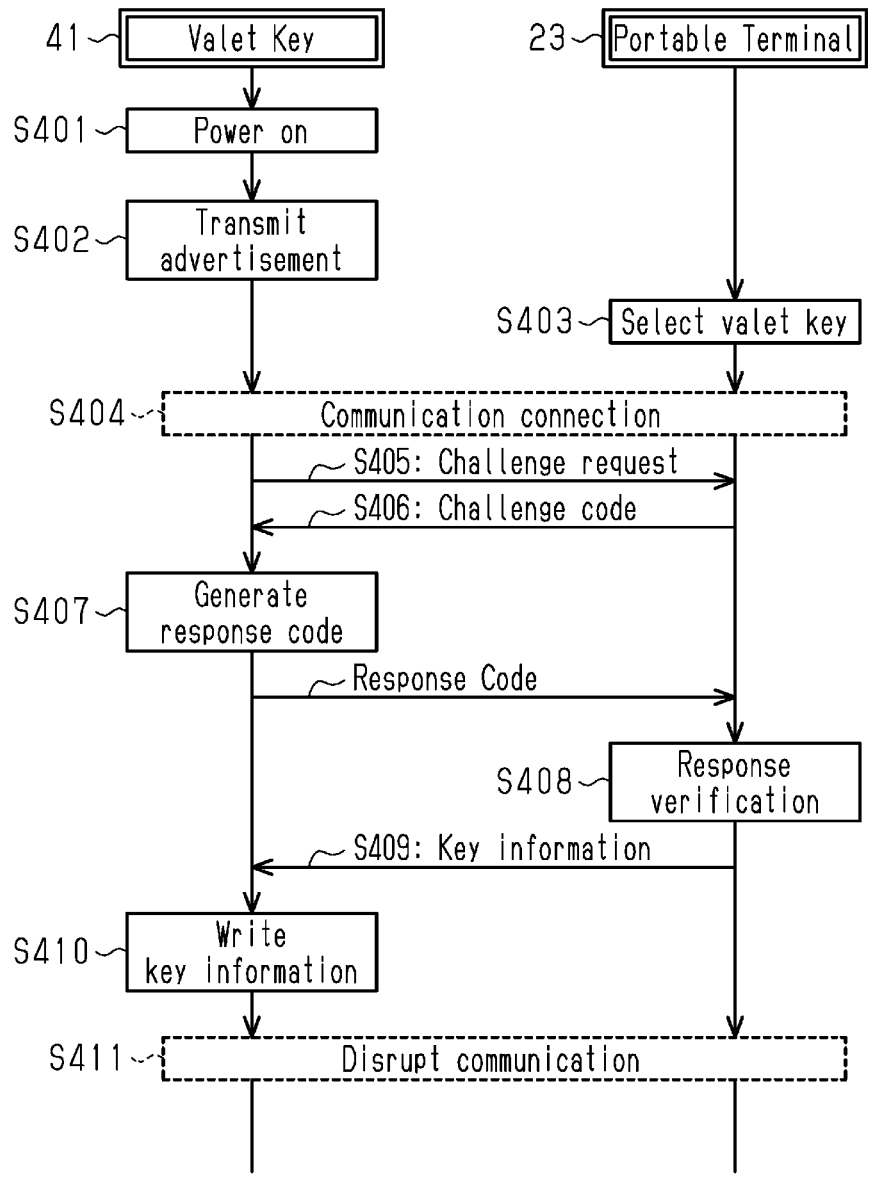
FIG. 7 is a flowchart illustrating the procedure for granting an operation privilege to a valet key.

FIG. 7 is a flowchart showing the procedure in which the portable terminal 23 grants "operation privilege" to the valet key 41 to operate the vehicle 1. As shown in FIG. 7, in step 401, the valet key 41 switches to a power on state when, for example, the operation unit 43 is operated. Preferably, the power on operation is operation of the power operation portion of the valet key 41.

In step 402, when the power is switched on, the valet key 41 starts transmitting advertising packets (hereinafter referred to as "advertisements").

In step 403, the portable terminal 23 receives an operation input for selecting the valet key 41 as a device connected through Bluetooth communication. That is, the connection peer for Bluetooth communication is selected in the portable terminal 23.

In step 404, the portable terminal 23 and the valet key 41 are connected through Bluetooth (BLE) communication. In this case, for example, the portable terminal 23 responds to an advertisement from the valet key 41 and returns a connection request in response. When the valet key 41 receives the connection request, communication connection occurs.

In step 405, when the valet key 41 (third privilege granting unit 48*c*) is connected to the portable terminal 23 through communication, the valet key 41 transmits a challenge request to the portable terminal 23 and requests for the transmission of a challenge code.

In step 406, upon receipt of the challenge request from the valet key 41, the portable terminal 23 (second privilege granting unit 48*b*) transmits a challenge code used for challenge response authentication to the valet key 41.

In step 407, upon receipt of the challenge code from the portable terminal 23, the valet key 41 (third privilege granting unit 48*c*) uses the encryption code stored in the valet key 41 to generate a response code. Then, the valet key 41 (third privilege granting unit 48*c*) transmits the generated response code to the portable terminal 23.

In step 408, upon receipt of the response code from the valet key 41, the portable terminal 23 (second privilege granting unit 48*b*) executes response verification by comparing the response code with a response code obtained by performing a calculation similar to that performed by the valet key 41 using the encryption code stored in the portable terminal 23. When the response code calculated and obtained by the portable terminal 23 matches the response code calculated and obtained by the valet key 41, the response verification is successful and processing is continued. When the response codes do not match, the response verification is unsuccessful and processing is forcibly terminated.

In step 409, when the response verification is successful, the portable terminal 23 (second privilege granting unit 48*b*) transmits the second key information Dk2 for the valet key 41, which is registered to the memory 30, to the valet key 41. That is, the portable terminal 23 (second privilege granting unit 48*b*) transmits the second key information Dk2 for the valet key 41 to the valet key 41 to grant "operation privilege" to the valet key 41 to operate the vehicle 1. The second key information Dk2 is usable only by the valet key 41.

In step 410, upon receipt of the second key information Dk2 from the portable terminal 23, the valet key 41 (third privilege granting unit 48*c*) writes the second key information Dk2 to the memory 45. This allows the valet key 41 to be used as a vehicle key.

In step 411, communication (Bluetooth communication) between the portable terminal 23 and the valet key 41 is disrupted. This ends communication between the portable terminal 23 and the valet key 41. The operation performed when the vehicle 1 is actuated by the valet key 41 is the same as steps 101 and 104 and steps 201 to 203 and thus will not be described.

Figure 6:
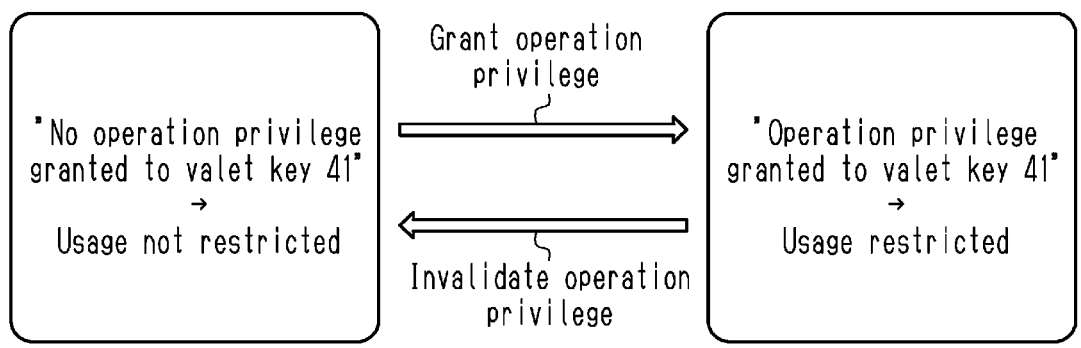
FIG. 6 is a portable terminal state transition chart illustrating operation privilege granting.

As shown in FIG. 6, when the portable terminal 23 grants operation privilege to the valet key 41, the restriction imposing unit 49 switches the actuation state (usage mode) of the portable terminal 23 from a "non-restricted" normal state to a "restriction-imposed" restriction state. The restriction related to vehicle usage may be a state in which the portable terminal 23 prohibits operation of the entire vehicle 1. Further, the restriction related to vehicle usage may be a state in which the portable terminal 23 prohibits operation of only some of the functions of the vehicle 1. For example, the portable terminal 23 may restrict only starting of the engine 6.

Figure 8:
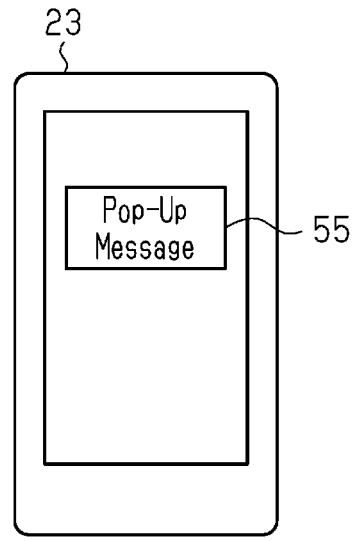
FIG. 8 is a schematic diagram showing one example for restricting usage of the portable terminal.

As shown in FIG. 8, the restriction related to vehicle usage may be a process that notifies the user that the valet key 41 is granted operation privilege when the user operates the vehicle 1 with the portable terminal 23. For example, a pop-up message 55 may be displayed on the screen of the portable terminal 23 as a notification indicating that the valet key 41 is granted operation privilege.

Figure 9:
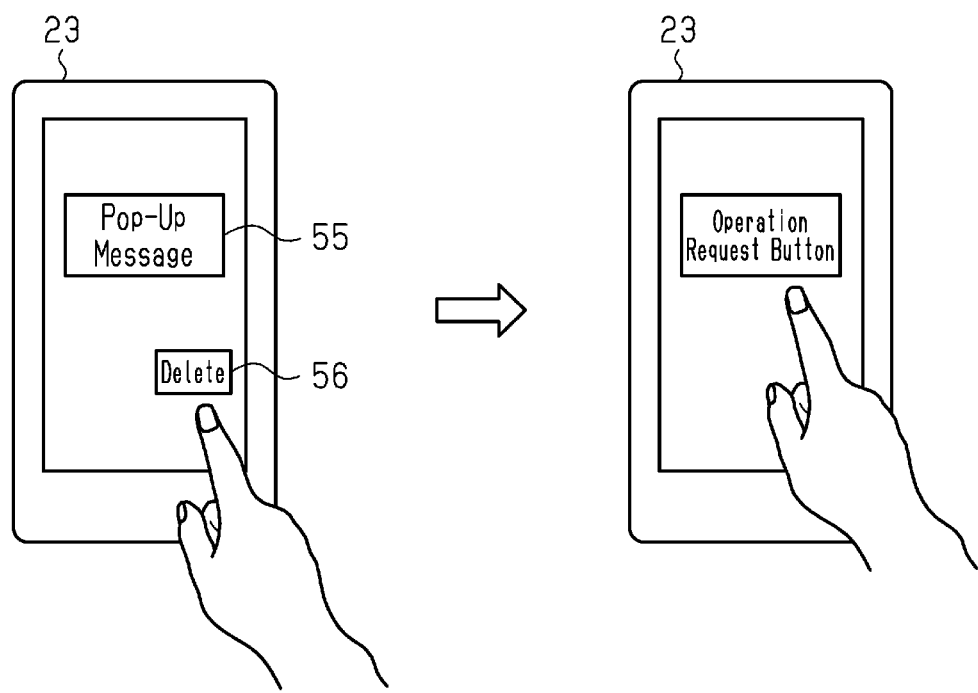
FIG. 9 is a schematic diagram showing one example for restricting usage of the portable terminal.

Further, as shown in FIG. 9, the restriction related to vehicle usage may be a process that prompts the user who is operating the vehicle 1 with the portable terminal 23 to perform a one-action operation before operating the vehicle 1. For example, a pop-up message 55 may be displayed on the screen of the portable terminal 23 as a notification indicating that the valet key 41 is granted operation privilege, and the pop-up message 55 is deleted by tapping a deletion button 56. When the pop-up message 55 is deleted from the screen, an operation request button (lock request button, unlock request button, engine start permission request button, etc.) that can be tapped is displayed so that the operation request button can be operated.

Figure 10:
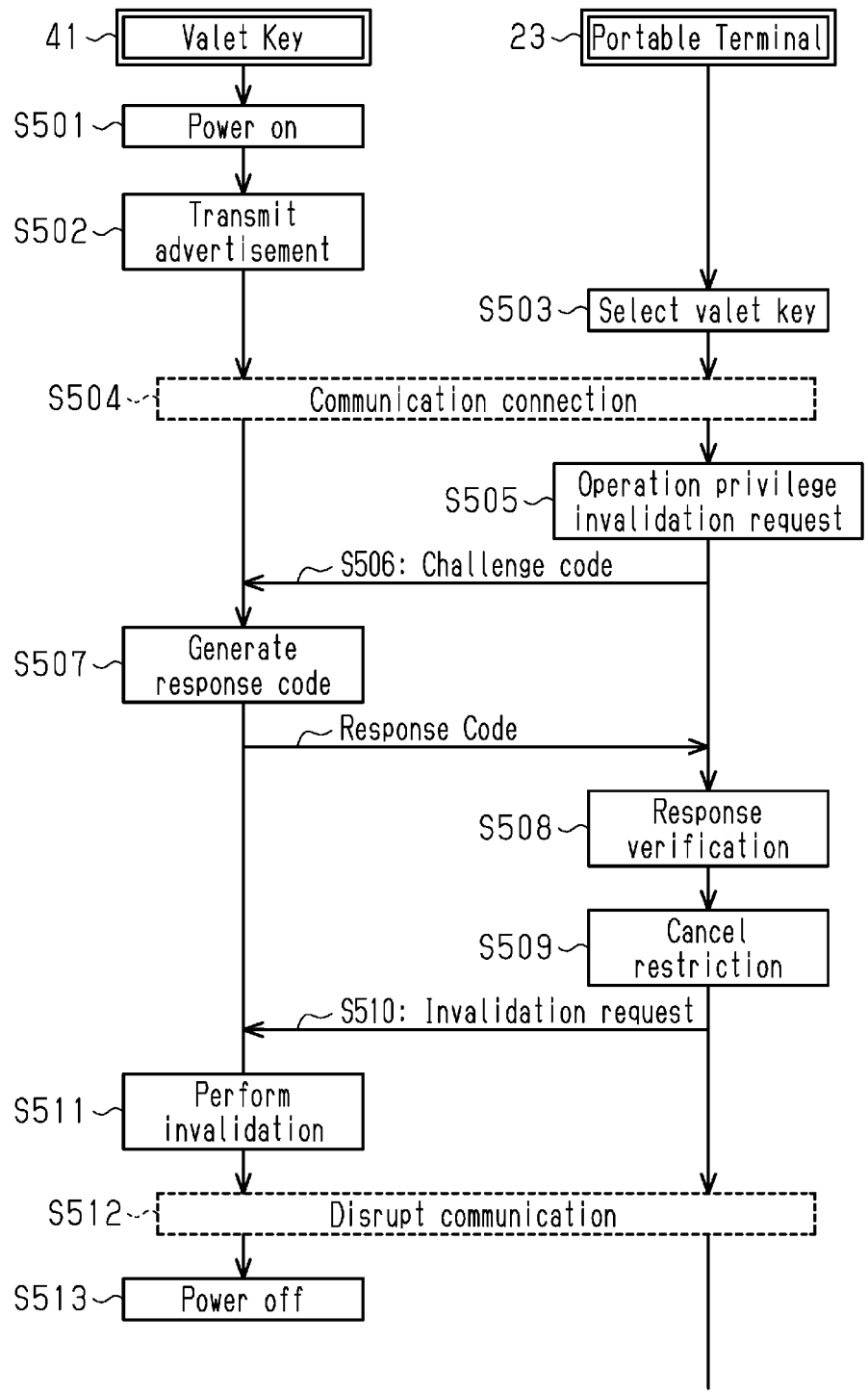
FIG. 10 is a flowchart illustrating the procedure for canceling the portable terminal restriction.

FIG. 10 is a flowchart illustrating the procedure for invalidating the "operation privilege" granted to the valet key 41 by the portable terminal 23. In FIG. 10, steps 501 to 504 respectively correspond to steps 401 to 404 (refer to FIG. 7) and thus will not be described.

In step 505, when the user operates the portable terminal 23 to invalidate the operation privilege of the valet key 41, an operation privilege invalidation request is input to the portable terminal 23. Preferably, in the present example, the operation for invalidating the operation privilege of the valet key 41 is, for instance, an operation that selectively operates an invalidation request button displayed on the screen of the portable terminal 23.

In step 506, the portable terminal 23 transmits a challenge code when the operation requesting for operation privilege invalidation is performed on the portable terminal 23.

In step 507, upon receipt of the challenge code from the portable terminal 23, the valet key 41 uses the encryption code stored in the valet key 41 to verify the response code. Then, the valet key 41 transmits the generated response code to the portable terminal 23.

In step 508, upon receipt of the response code from the valet key 41, the portable terminal 23 executes response verification by comparing the response code with a response code obtained by performing a calculation similar to that performed by the valet key 41 using the encryption code stored in the portable terminal 23. When the response code calculated and obtained by the portable terminal 23 matches the response code calculated and obtained by the valet key 41, the response verification is successful and processing is continued. When the response codes do not match, the response verification is unsuccessful and processing is forcibly terminated.

In step 509, when response verification performed with the valet key 41 is successful, the portable terminal 23 (restriction canceling unit 50) cancels the restriction imposed on the portable terminal 23. That is, the restriction canceling unit 50 cancels the restriction imposed on the portable terminal 23 when invalidating the operation privilege of the valet key 41. This returns the operation privilege mode of the portable terminal 23 to a normal state so that the vehicle 1 can be operated by the portable terminal 23 without any restrictions.

In step 510, after the restriction is canceled, the portable terminal 23 transmits an invalidation request to the valet key 41 to invalidate the granted operation privilege.

In step 511, when the valet key 41 receives the invalidation request from the portable terminal 23, the valet key 41 invalidates the privilege to operate the vehicle 1. In the present example, the second key information Dk2 (user authentication code) is deleted from the memory 45 of the valet key 41 Thus, the valet key 41 can no longer operate the vehicle 1.

In step 512, communication (Bluetooth communication) is disconnected between the portable terminal 23 and the valet key 41. This ends communication between the portable terminal 23 and the valet key 41.

In step 513, the valet key 41 turns the power off. This shifts the valet key 41 to a standby state.

In the present example, when the portable terminal 23 grants operation privilege to the valet key 41, a restriction is imposed on the use of the portable terminal 23. Thus, when using the valet key 41, the portable terminal 23 cannot be freely operated. This allows for acknowledgement that operation privilege has been granted to the valet key 41. As a result, the user will be reminded that the valet key 41 has been granted operation privilege, and a situation in which the user forgets that the valet key 41 has been left granted with the operation privilege will be avoided. Thus, security against unauthorized use of the vehicle 1 will be maintained, while granting operation privilege to the valet key 41 from the portable terminal 23 to permit operation of the vehicle 1.

The sharing system 21 includes the restriction canceling unit 50. Thus, even if a restriction is imposed on the portable terminal 23, the portable terminal 23 can be returned to the original non-restricted state.

The operation privilege is the key information Dk, and the key information Dk is a one-time key that can be used only once or within a fixed time period. This limits situations in which the key information Dk is used in an unauthorized manner to operate the vehicle 1 and is advantageous for improving security.

If a restriction is imposed on the portable terminal 23, the restriction imposing unit 49 executes a process for notifying the user that operation privilege has been granted to the valet key 41 when the portable terminal 23 is used to operate the vehicle 1. This allows the user to be notified that operation privilege has been granted to the valet key 41.

When a restriction is imposed on the portable terminal 23, the restriction imposing unit 49 executes a process for prompting the user to perform a one-action operation before operating the vehicle 1 with the portable terminal 23. Thus, when the valet key 41 is granted operation privilege, the user will be prompted to perform a one-action operation whenever the portable terminal 23 is operated so that the user will not forget that operation privilege has been granted to the valet key 41.

The present embodiment may be modified as described below. The present embodiment and the following modifications can be combined as long as the combined modifications remain technically consistent with each other.

The sharing device 24 may be retrofitted to the vehicle 1 or installed from the beginning in the vehicle 1.

The sharing device 24 may be integrated with the verification ECU 9 to form a single unit.

The sharing device 24 can be installed anywhere.

The issuance of the notification that a restriction is imposed does not have to be performed by only the portable terminal 23. For example, the notification may be issued to other devices such as the vehicle 1.

Sound may be used to issue the restriction notification.

The one-action operation performed by the user when the restriction is imposed may be changed, for example, to another mode such as multiple pushing of the operation request button.

The invalidation of the operation privilege does not have to be performed by operating the screen of the portable terminal 23. For example, the invalidation may be performed through any manner such as by operating the valet key 41 or through the server 22.

The vehicle 1 does not have to be reserved with the portable terminal 23 and may be reserved with the valet key 41.

The vehicle 1 may be reserved with only the valet key 41 without the portable terminal 23 being involved.

Authentication of the portable terminal 23 and the sharing device 24 is not limited to authentication of the key information Dk and may be changed to other methods.

The granting of the operating privilege does not have to be performed by sending the key information Dk and may be changed to, for example, another method such as sending a usage permission command.

The near-range wireless communication is not limited to Bluetooth communication and may be changed to another communication protocol.

The key information Dk is not limited to a one-time key and may be any information of which usage is limited.

The content included in the key information Dk may be changed to one other than that of the above embodiment.

The key information Dk does not have to be generated by the server 22 and may be generated anywhere as long as it is generated by an external device.

The encryption code used for encrypted communication may be, for example, any of the unique sharing device code, the user authentication code, and the unique electronic key code. For example, switching encryption codes during the process will be further advantageous for improving the communication security. Further, the encryption code used is not limited to the above-mentioned codes and may be changed to various types of codes.

The portable terminal 23 is not limited to a high-performance mobile phone and may be changed to various types of terminals.

The portable terminal 23 and the sharing device 24 may obtain the user authentication code through any procedure and method.

The key function may be turned on under any condition.

The privilege granting unit 48, the restriction imposing unit 49, and the restriction canceling unit 50 do not have to be functionally generated by the user interface application 31 and may be generated through another method or configured by a hardware element.

The operation-free electronic key system 4 is not limited to a system that performs smart verification while determining whether the electronic key 2 is located outside or inside the passenger compartment with interior and exterior transmitters. For example, the system can determine whether the electronic key 2 is located outside or inside the passenger compartment by arranging left and right antennas (LF antennas) on the left and right sides of the vehicle body and checking the combination of responses from the electronic key 2 to the radio waves transmitted from the antennas.

The ID verification performed by the electronic key system 4 is not limited to challenge response authentication and may be any authentication or verification as long as the electronic key ID is verified.

The electronic key system 4 may be, for example, a wireless key system that executes ID verification when the electronic key 2 starts communication.

The electronic key 2 is not limited to Smart Key (registered trademark) and may be a wireless key.

The verification ECU 9 and the sharing device 24 do not have to establish wireless communication and may be, for example, connected by wire. In this case, the sharing device 24 transmits various types of commands to the verification ECU 9 through wired communication. Even in this case, the verification ECU 9 can be actuated by instructions from the sharing device 24.

The sharing device 24 does not have to use the electronic key system to actuate the shared subject 19. In this case, the sharing device 24 directly transmits an instruction to a controller (CPU) that controls actuation of the shared subject 19 to actuate the shared subject 19. In this configuration, the key function of the sharing device 24 can be omitted.

The application of the sharing system 21 is not limited to the vehicle 1. For example, the sharing system 21 can be applied to another apparatus or device such as a house (shared house), a shared delivery locker, or a coin-operated parking lot. Accordingly, the shared subject 19 is not limited to the vehicle 1 and may be changed to another member.

A technical concept that can be understood from the above embodiment and the modified examples will now be described.

(A) A sharing method that allows a shared subject to be operated by each of a portable terminal and a valet key. The portable terminal obtains key information required to use the shared subject and is allowed to operate the shared subject when the key information is authenticated through communication with the sharing device. The sharing method includes granting privilege from the portable terminal to the valet key to operate the shared subject and imposing a restriction to usage of the portable terminal when the privilege for operating the shared subject is granted from the portable terminal to the valet key.

The invention claimed is:

1. A sharing system, comprising:
    a sharing device arranged in a shared subject;
    a valet key that is allowed to operate the shared subject;
    a portable terminal that obtains key information required to use the shared subject and is allowed to operate the shared subject when the key information is authenticated through communication with the sharing device;
    a privilege granting unit that grants privilege to operate the shared subject from the portable terminal to the valet key; and
    a restriction imposing unit in the portable terminal that imposes a restriction on operation of the portable terminal to operate the shared subject when the privilege to operate the shared subject is granted from the portable terminal to the valet key.

2. The sharing system according to claim 1, further comprising:
    a restriction cancelation unit that cancels the restriction set to the portable terminal when an operation is performed to invalidate the operation privilege granted to the valet key.

3. The sharing system according to claim 1,
    wherein the operation privilege is the key information used for authentication by the portable terminal and the sharing device, and
    the key is a one-time key that can be used only once or within a fixed time period.

4. The sharing system according to claim 1,
    wherein the restriction imposing unit executes a process for notifying a user that the valet key has been granted the operation privilege when the shared subject is operated by the portable terminal.

5. The sharing system according to claim 1, wherein the restriction imposing unit executes a process for prompting a user to perform a one-action operation before operating the shared subject with the portable terminal.

* * * * *